United States Patent [19]
Moore

[11] 3,821,925
[45] July 2, 1974

[54] APPARATUS FOR PRESSURE COOKING FOODS

[76] Inventor: George A. Moore, 843 N. Dellrose, Wichita, Kans. 67208

[22] Filed: July 3, 1969

[21] Appl. No.: 871,409

Related U.S. Application Data

[63] Continuation of Ser. No. 480,998, Aug. 19, 1965, abandoned.

[52] U.S. Cl................. 99/327, 99/107, 99/336, 99/337, 99/407
[51] Int. Cl. ........................................... A47j 37/12
[58] Field of Search ............ 99/107, 403, 407, 327, 99/336, 347, 337, 345; 126/377; 220/55 PC, 55.3, 33

[56] References Cited
UNITED STATES PATENTS

| | | | |
|---|---|---|---|
| 1,323,028 | 11/1919 | Demuth | 99/345 |
| 1,393,761 | 10/1921 | Demuth | 99/347 |
| 1,393,762 | 10/1921 | Demuth | 99/347 |
| 2,827,379 | 3/1958 | Phelan | 99/403 |
| 2,938,648 | 5/1960 | Phelan et al. | 220/55.3 |
| 2,942,753 | 6/1960 | Kelton | 220/33 |
| 2,964,215 | 12/1960 | Kelton | 220/33 X |
| 3,159,095 | 12/1964 | Wagner | 99/403 X |
| 3,187,664 | 6/1965 | Jennings | 99/407 X |
| 3,280,722 | 10/1966 | Rahauser | 99/403 X |

FOREIGN PATENTS OR PUBLICATIONS
832,592  4/1960  Great Britain ............220/55 P.C Primary Examiner—Billy J. Wilhite
Attorney, Agent, or Firm—Robert E. Breidenthal

[57] ABSTRACT

Apparatus for cooking moisture-containing foods. The apparatus is of the deep-fat pressure cooker type and includes a cover or closure means that is sealingly movable downwardly into the upper portion of an open topped cooking pot, whereby the pot is selectively closable by the closure means and in addition the latter serves on downward movement into the pot to compress and pressurize the contents of the pot by reducing the folume of the confined space. Food supporting means are dependingly carried by the closure means, whereby food can be lowered in the pot to be immersed in a hot cooking liquid (oil or fat) in the pot at the same time as closure means closes the pot and is in the act of compressing the contents thereof. The apparatus includes means for forcibly moving the closure means, and pressure relief and vapor venting means, as well as an electrical control and timer system to control cooking fluid temperature, and to control automatically timed upward and downward movements of the closure means.

7 Claims, 8 Drawing Figures

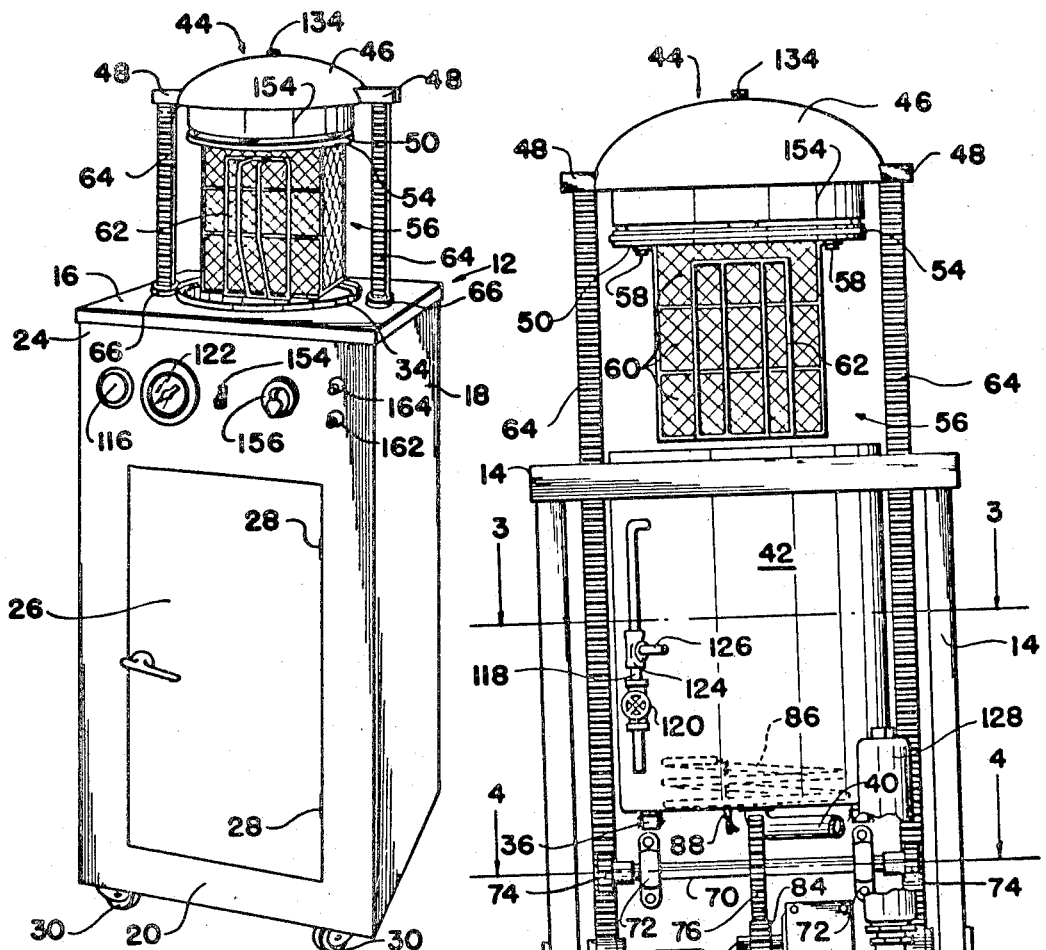
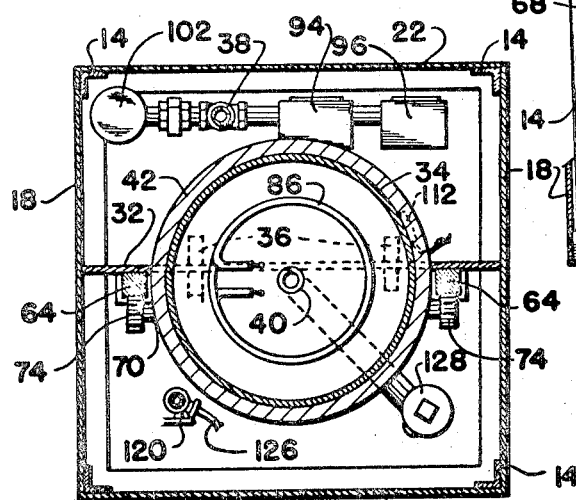
FIG. 1
FIG. 2
FIG. 3
INVENTOR.
GEORGE A. MOORE
BY John H. Widdowson
ATTORNEY

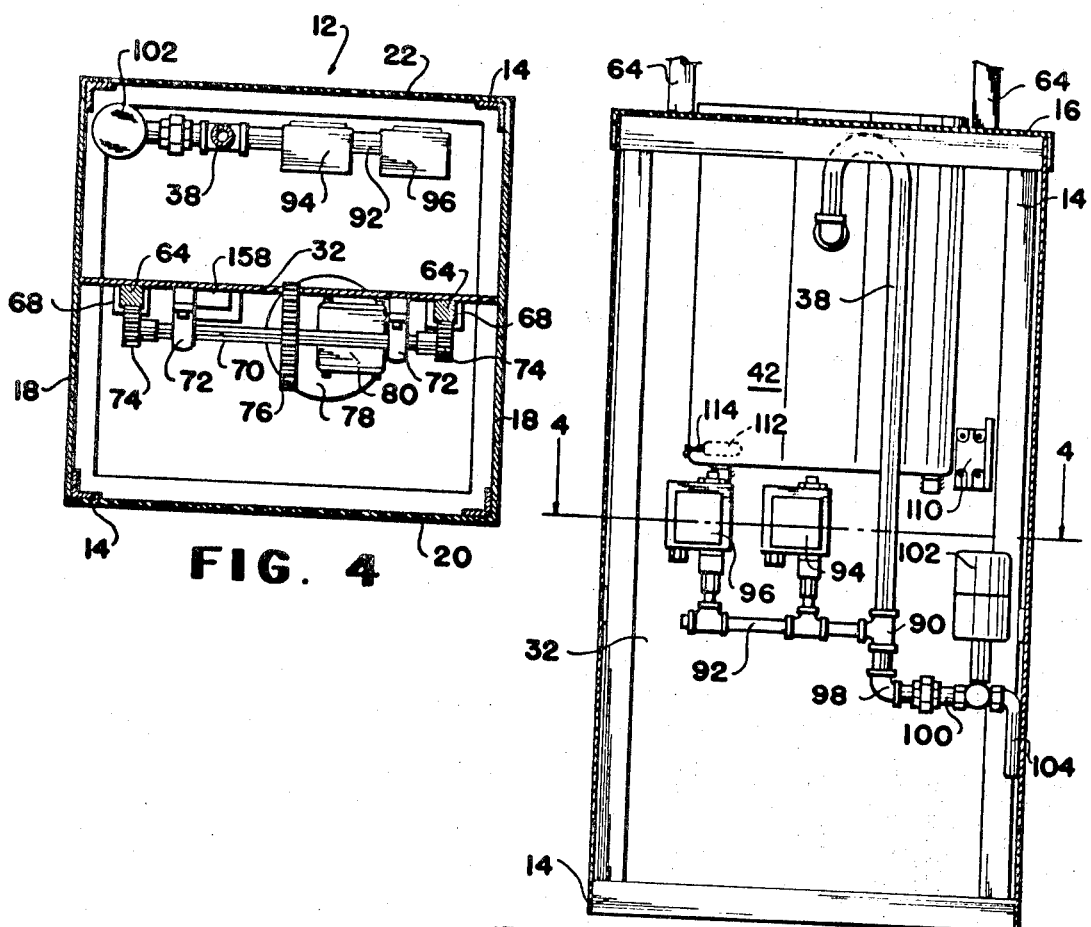
FIG. 4
FIG. 5
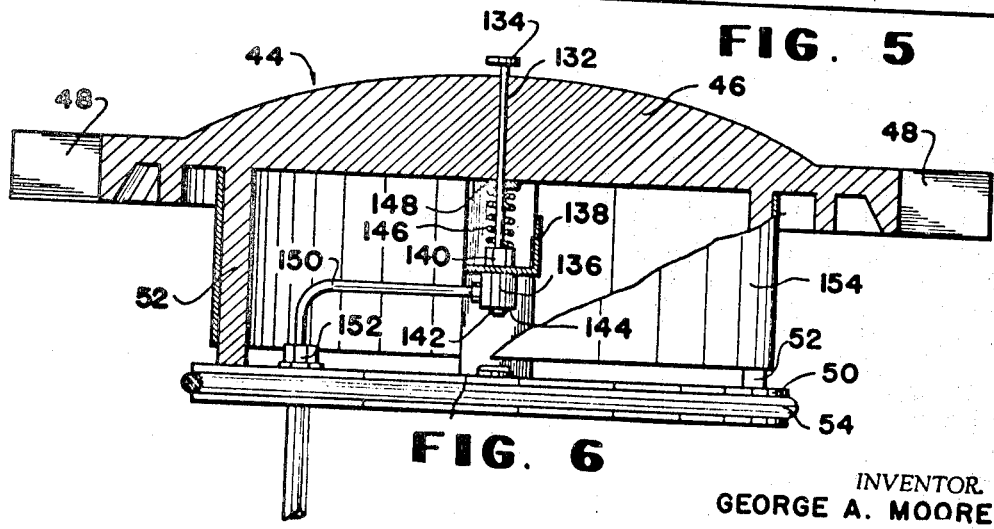
FIG. 6
INVENTOR.
GEORGE A. MOORE
BY
John H. Widdowson
ATTORNEY

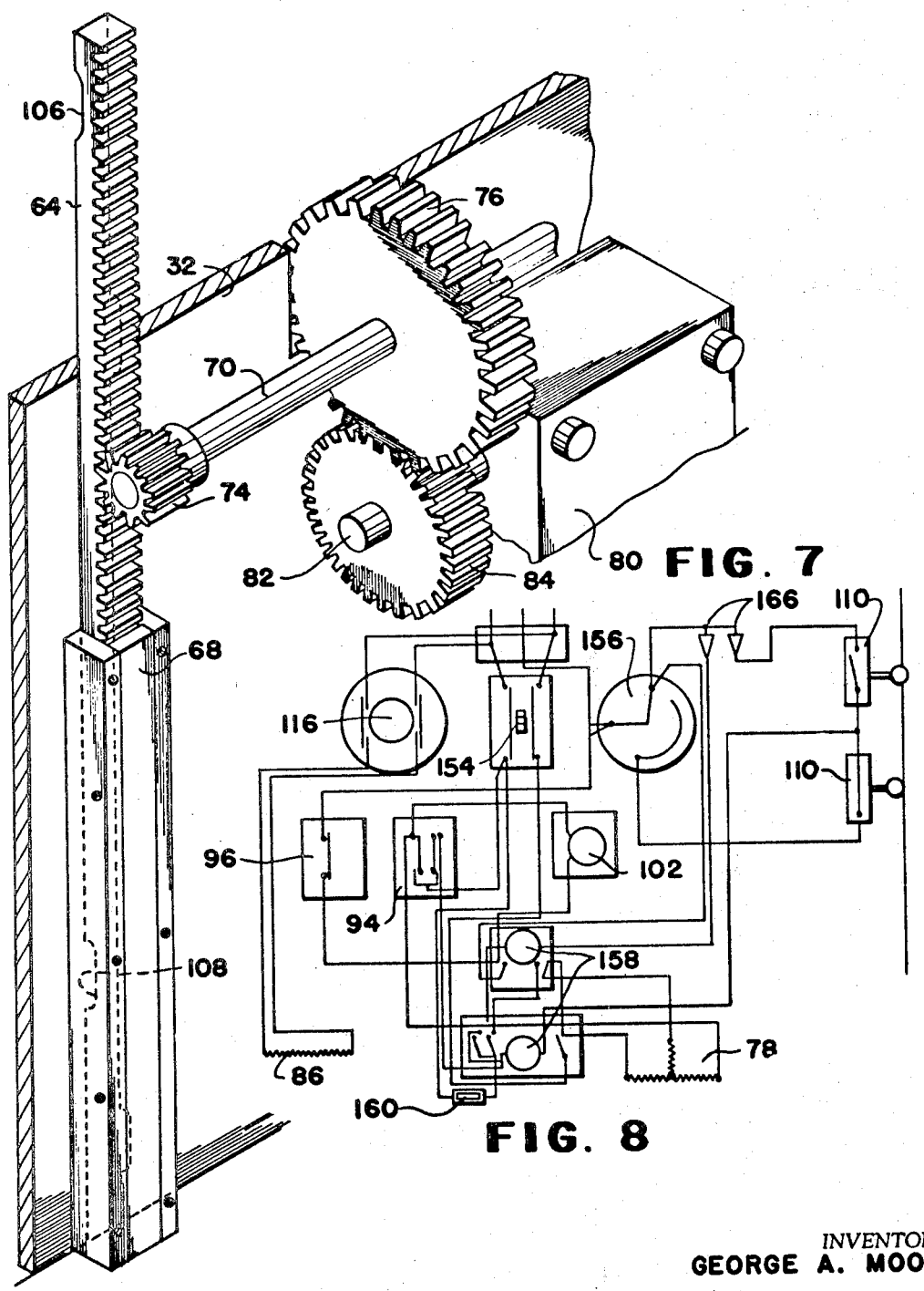

APPARATUS FOR PRESSURE COOKING FOODS

This application is a continuation of my similarly entitled pending application Ser. No. 480,998, which was filed Aug. 19, 1965 now abandoned.

This invention relates to a new apparatus for cooling foods, especially cooking foods under pressure while immersed in cooking fluid. More particularly this invention relates to a new apparatus for so-called deep-fat pressure cooking foods wherein the pot containing cooking fat and/or oil fluid is immediately pressurized to cooking pressures upon closing of a cover for same. And in a more particular sense this invention relates to apparatus for deep-fat pressure cooking foods that compresses the gases above cooking fluids in a pot creating immediate cooking pressures therein.

Apparatus of so-called deep-fat frying foods are well known in the art. However many of these apparatus require manual operation and manual attention, creating the need for constant watching, and causing inconsistant results from the cooking process. Some machines, known to the art, cook foods under pressure for faster cooking. However, these machines create a pressure in the cooking vessel only by the vaporizing of the water content in the foods being processed and creating a steam pressure above the cooking fluids therein. As can be easily seen, this process requires additional time to build up a proper cooking pressure in the vessel for optimum food processing. Many of the machines are also unsafe in operation because they do not have adequate pressure releasing means at the end of a cooking cycle and can be quite dangerous in use to an operator. Other machines of the prior art do not have adequate automatic controls so that an unskilled operator is unable to satisfactorily process foods.

The automatic pressure cooker that I have invented has a pot means and a cover movably mounted relative to each other to vary the volume of the vapor space within the pot means. Seal means between the cover and pot means make an effective seal therebetween in operation to reduce the vapor space in the pot means and increase the pressure therein. Means for closing the pot means are mounted relative to the cover and pot means. The cooker is constructed and adapted to cook foods in a cooking fluid in the pot means by immersing food in the fluid, the seal means sealingly closing the pot means to create and maintain pressure therein during cooking.

The apparatus of so-called deep-fat frying food of my invention overcomes the disadvantages inherent in the prior art. I have provided an apparatus that is completely automatic and safe in operation so that foods can be cooked properly and consistently by untrained and unskilled operators. My new apparatus substantially reduces the cooking time required for cooking foods such as chicken, fish and the like by applying immediate pressure to the cooking vessel so that optimum cooking conditions exist upon the closing of the cover of my apparatus.

It is another object of my invention to provide a new apparatus for pressure cooking foods, while immersed in a cooking fluid such as fat or oil.

Still another object of my invention is to provide a new apparatus for deep-fat pressure cooking foods that creates immediate cooking pressures in the cooking vessel.

Still another object of my invention is to provide a new apparatus for deep-fat pressure cooking foods that is fully automatic.

And another object of my invention is to provide a new apparatus for deep-fat pressure cooking foods that can be satisfactorily operated by an unskilled operator.

And one more object of my invention is to provide an apparatus for deep-fat pressure cooking foods that safety controls the pressures within the cooking vessel.

Yet another object of my invention is to provide a new apparatus for deep-fat pressure cooking foods that is safe to operate.

Various other objects, advantages, and features of the invention will become apparent to those skilled in the art from reading this disclosure.

Drawings accompany and are a part of this disclosure. These drawings depict preferred specific embodiments of the apparatus for deep-fat pressure cooking foods of my invention, and it is to be understood that these drawings are not to unduly limit the scope of the invention. In the drawings, FIG. 1 is a view in perspective of a preferred specific embodiment of the pressure cooker apparatus of my invention.

FIG. 2 is a front elevation view of the preferred specific embodiment of my invention partially cut away.

FIG. 3 is a cross section view taken along line 3—3 of FIG. 2.

FIG. 4 is a cross section view taken along line 4—4 of FIG. 2 and FIG. 5.

FIG. 5 is a back view of the preferred specific embodiment of the apparatus of my invention with the back cover removed.

FIG. 6 is an enlarged partial cross section of the preferred specific embodiment of a cover and O-ring lubricating assembly.

FIG. 7 is a perspective view of a preferred specific embodiment of the lid actuating mechanism.

FIG. 8 is a diagrammatic view of the preferred electrical and control system of my invention.

Referring now to the drawings in detail, FIG. 1 shows a preferred specific embodiment of my invention which includes a boxlike housing generally referred to at 12. The housing 12 has a frame 14 preferably made of angle iron and preferably of welded construction. Attached to the frame, preferably by welding, is a top 16, two sides 18, a front 20 and a back 22. The top portion of the front 20 defines an instrument panel 24. A door 26 is mounted by hinges 28 in a lower portion of the front 20. A caster 30 is preferably mounted on each bottom corner portion of the frame 14. Any type of suitable supporting device such as adjustable legs and the like may be used instead of the casters 30 to support the frame.

A vertical mounting panel 32 is rigidly mounted on the frame 14 between the two sides 18 at a point approximately midway between the front 20 and the back 22. This panel 32 can be made of any suitable material such as plastic, fibrous material, or metal, and the like, but preferably of aluminum. A cup-shaped cylindrical pot 34 is rigidly mounted on the top end portion of the mounting panel 32 by mounting brackets 36. Screw means (not shown) are preferably used for mounting the brackets 36 on the panel 32 and the pot 34. The pot 34 when so mounted extends upwardly a suitable distance so as to project through a pot hole in the top 16 provided for same. The upper inside portion of the open end portion of the pot 34 has an inside annular taper forming a relatively narrow annular edge on the projecting end portion of the pot 34.

A pressure line 38 is sealingly mounted in an upper side portion of the pot 34. This line 38 is mounted above the fluid level of cooking fluids which can be introduced into the pot 34. The pressure line 38 extends upwardly a short distance and forms a gooseneck before extending downwardly within the housing 12. A drain line 40 is rigidly mounted in a central bottom portion of the pot 34. Insulation 42 is preferably mounted on the outside portion of the pot 34. This insulation 42 can be of any suitable insulating material such as asbestos, glass, or the like but preferably of asbestos. A pot cover 44 has a generally round dome-shaped top portion 46 with an outside diameter slightly greater than the outside diameter of the pot 34. Two oppositely mounted flanges 48 are on the edge portion of the top portion 46. A circular seal portion 50 of the cover 44 is rigidly mounted to the top portion 46 preferably by four vertical connecting members 52. A circular O-ring 54 is mounted in a groove on the circumferential edge of the seal portion 50 and is of a size to sealingly engage the inner walls of the pot 34. The cover 44 and the pot 34 can be made of any suitable material for food cooking, such as plastic, metal, or the like but preferably of an aluminum alloy and formed by casting same. A food basket 56 is preferably removably mounted on the bottom portion of the seal portion 50 by screw means 58. This food basket 56 preferably has three slidably removable basket drawers 60 and a safety drawer closing rack 62 hingedly mounted on a bottom portion of the basket 56.

A geared bar 64 is rigidly mounted in each of the flanges 48 preferably by a pin means and depends therefrom. Bar apertures are provided in the top 16 to allow the geared bars 64 to project therethrough. Bearings 66 are engageably mounted between the bar 64 and the apertures in the top 16. These bearings 66 can be made of any suitable material that is friction reducing but preferably of nylon. An inverted channel 68 is vertically and rigidly mounted on each front side portion of the mounting panels 32, and positioned so as to slidably receive the downwardly depending end portions of the geared bars 64, with one of the geared bars 64 projecting into one of the channels 68 and the other of the geared bars 64 projecting into the other of the channels 68.

A shaft 70 is turnably and horizontally mounted on the top front portion of the mounting panel 32 by at least two bearings 72. The shaft 70 is preferably made of shaft steel and the bearings 72 are preferably of bronze sleeve and mounted to the mounting panel 32 by screw means. A bar gear 74 is rigidly mounted on each projecting end portion of the shaft 70 immediately above the top end portions of each of the channels 68. One of the bar gears 74 operably engaging one of the geared bars 64 and the other of the bar gears 74 operably engaging the other of the geared bars 64. A drive gear 76 is rigidly mounted on a central portion of the shaft 70. A reversible electric motor 78 is rigidly mounted on the mounting panel 32 with the upwardly projecting motor shaft (not shown) drivingly connected to a worm gear assembly 80 which is mounted on the mounting panel 32 immediately above the motor 78. The gear assembly has a drive shaft 82 horizontally projecting from a side portion thereof with another gear 84 rigidly mounted thereon. The last-named gear 84 drivingly engages the drive gear 76.

An electrical heating element 86 is sealingly mounted in the bottom portion of the pot 34. Electrical connections 88 sealingly project through the bottom portion of the pot 34. A tee pipe fitting 90 is threadedly mounted in the lower portion of the pressure line 38. A pressure switch line 92 is horizontally and threadedly mounted in the tee 90. A control pressure switch 94 and an excess pressure switch 96 are mounted in series on the pressure line 92. An elbow 98 is threadedly mounted on the downwardly projecting end portion of the pressure line 38 providing a horizontally projecting portion 100 of the pressure line 38. A pressure release valve 102 is threadedly mounted on the projecting end portion of the horizontal portion 100. Valve 102 is more particularly described in my co-pending patent application entitled PRESSURE RELEASE VALVE, filed July 16, 1965, Ser. No. 472,440, now U.S. Pat. No. 3,421,546 which issued Jan. 14, 1969. In this use, the spring tension on the valve is set to maintain a pressure between 14 and 16 pounds and preferably approximately 15 pounds. An exhaust line 104 is threadedly mounted on the outlet end portion of the valve 102 and is vented to the atmosphere. The gooseneck in the top portion of pressure line 38 tends to keep cooking fluids in the pot 34, allowing only gases to escape into the pressure line 38. In the event small amounts of fluids do escape into pressure line 38, they are easily exhausted through the self-cleaning pressure valve 102 and out the exhaust line 104.

One of the geared bars 64 is provided with a microswitch actuating recess 106 in the top back portion thereof, and another microswitch actuating recess 108 in a lower back portion of the bar 64. A microswitch means 110 is mounted on the mounting panel 32 so as to operably engage the geared bar 64 having the recesses 106 and 108 therein. A temperature sensing device 112 is sealingly mounted in a lower portion of the pot 34 and is operably connected by conduit means 114 to a thermostat 116 mounted on the instrument panel 24. Thermostat 116 is operably connected to the heating element 86 by wiring means connected to electrical connections 88. Thermostat 116 preferably has an on-off switch in connection therewith for the heating element 186 and a temperature control range of between 200° and 500° F. A manual bleed-off line 118 is sealingly mounted in a top portion of the pot 34 and has a manual bleed-off valve 120 threadedly mounted on the downwardly depending end portion thereof. A pressure gauge 122 is mounted on the instrument panel 24 and is operably connected to bleed-off line 118 by a tee connection 124 and conduit 126 mounted therein. A filter 128 is threadedly connected to the end portion of the drain pipe 40 and has a manual drain valve 130 mounted in the outlet portion thereof.

An O-ring lubricating assembly is mounted in the cover 44. A valve stem 132 is vertically mounted through the center portion of the top portion 46 of the cover 44, a valve actuating button 134 is mounted on the upwardly projecting end portion of the valve stem. A T-like valve body 136 is rigidly mounted to the bottom portion of the top cover portion 46 by a U-bracket 138. The valve stem 132 projects downwardly through the valve body 136. A packing gland 140 slidably seals the valve stem 132 in the valve body 136. A lubricating valve 142 is rigidly mounted on the downwardly projecting end portion of the valve stem 132 and operably engages a valve seat 144 on the bottom end portion of the body 136. A helical spring 146 is mounted on the valve stem 132 between a top portion of the packing gland 140 and a threadedly mounted adjusting nut 148 mounted on the stem 132. The spring 146, being in compression, tends to urge the valve 142 to engage the valve seat 144. A fluid tube 150 sealingly projects through the seal portion 50 to communicate with cooking fluids in the pot 34 when the cover 44 is in the lowered position. A packing gland 152 provides a seal means through the seal portion 50. A generally cylindrical shield 154 is preferably mounted on the support members 52 substantially enclosing the O-ring lubricating assembly. The O-ring lubricating assembly is constructed and adapted to pass cooking fluids through the line 150 out of the pot 34 into the body 136 under pressure. When the valve stem 132 is depressed by pressure exerted on the buttom 134, the valve 142 disengages from the valve seat 144 and allows cooking fluids to be sprayed therefrom and falling on the top portion of the seal portion 50 and lubricating the O-ring 54. The O-ring 54 can be made of any suitable heat resistant pliant material such as plastic, fiber or the like but preferably of a silicon compound. It has been found in use that an O-ring manufactured by the Plastic and Rubber Products Company of Los Angeles, Calif. under the trademark of PARCO is very satisfactory in use.

The electrcal system of the apparatus has a line switch 154 mounted on the instrument panel 24 and is operably connected to a source of electrical power. A timer 156 is mounted on the instrument panel 24. This timer 156 can be any suitable kind but preferably a clock-like spring operated timing mechanism which can be hand pre-set to the desired cooking interval, and at the expiration of such interval the timing device 156 actuates the pressure release valve 102 by a pressure switch 96, releasing all pressure in the pot 34. The motor 78 is actuated through the breaker means 158. The microswitch means 110 engages the recess 108 turning off motor 78 through the electrical system when the cover portion 44 is in the fully raised position.

At least one fuse 160 is operably mounted in the electrical system to protect the various elements thereof from overloading. A shunt button 162 is mounted on the instrument panel 24 and provides an emergency bypass of the fuse 160 allowing the electrical system to operate to release pressures and raise the cover 44 even though the fuse 160 is no longer operable. A pressure release button 164 is also mounted on the instrument panel 24 and is another safety device which can be used to directly actuate the pressure release valve 102 to release pressure in the pot 32. At least two diodes 166 are operably mounted in the electrical system to block feedback of electrical current within the system. Electrical wiring means operably connect all of the component parts of the electrical system.

In operation of the apparatus, the thermostat 116 is turned to a desired temperature of cooking fluids which have been introduced into the pot 34. This temperature can be any suitable temperature between 300° and 500° but preferably between 350° and 400°. When the cooking fluids have reached the desired temperature, the line switch 154 is turned to the on position which directs a current to the motor 78 to raise the cover to the up position as aforesaid. The safety rack 62 is swung downwardly away from the basket 56 allowing the drawers 60 to be opened and food placed therein for cooking. The timing device 156 is now preset to the desired time of the cooking cycle.

In the use of the apparatus, the cooking cycle is substantially shorter than those previously used in the art. Of course, the length of the cycle will vary with the types of food being processed, moisture content, thickness, and the degree of cooking desired. When the timer 156 is pre-set to, for example, 3 minutes which has been found to be very satisfactory timing cycle for ordinary chicken frying, the electrical system is energized, closing the pressure release valve 102 and starting the motor 78 to rotate the worm gear 80, gear 84, drive gear 76, shaft 70 and bar gears 74 in a direction to close the cover 44. As the cover 44 descends, food basket 56 is immersed in cooking fluids, the safety rack 62 engaging an inside portion of the pot 34 to safely close all drawers 60 of the food rack 56. During the downward travel of the cover 44 the seal portion 50 projects into the pot 34, the O-ring 54 engaging the inner walls of the pot 34 in a sealing relationship. The O-ring 54 maintains a sealing relationship during the remainder of the downward travel of the cover thus causing the gases in the top portion of the pot 34 to be compressed immediately. These gases can be compressed to any suitable pressure depending on the cooking fluid level in the pot 34, however it has been found in practice that a compression pressure of between 10 and 15 pounds is very satisfactory, but preferably approximately 12 pounds. It has also been found that the release of steam from the foods upon immersion in the hot cooking fluids provides sufficient additional pressures to immediately attain an optimum cooking pressure of between 15 and 18 pounds.

During the cooking cycle, the pressure release valve 102 maintains cooking pressures within 1 pound variations by the presetting of the spring tension in the valve 102. In the event, however, the food being processed has a large moisture content such as frozen foods, so that the pressures in the pot 34 exceed a desirable working pressure, pressure switch 96 is pre-set to actuate the solenoid in valve 102 to completely open same to relieve pressures in the pot 34 to a desired amount. Preferably, in the preferred specific embodiment of my invention, pressure switch 96 is set to actuated valve 102 when 18 pounds of pressure exists in the pot 34, and is set to close valve 102 when the pressure has been reduced to 15 pounds. At the end of the cooking cycle, the time 156 reactuates the electrical system substantially as shown on FIG. 8 to open the valve 102 allowing all the pressure in the pot 34 to safely escape and actuates the motor 78 to raise the cover 44 and removing the food from the cooking fluids in the pot 34. As can be readily seen, my machine is fully automatic and equipped with many safety features so that an unskilled workman can easily operate my apparatus to cook food consistently and satisfactorily.

The materials used in the apparatus of my invention, except when otherwise specified, are steel for the gearing and shafting and frame, and preferably stainless steel for the tops 16, sides 18, front 20, and back 22. The electrical wiring means are those commonly used in accepted electrical appliances assemblies.

The foregoing discussion and description has been made in connection with preferred specific embodiments of the deep-fat food cooker of my invention. However, it is to be understood that the discussion and description is only intended to illustrate and teach those skilled in the art how to practice the invention, and such is not to unduly limit the scope of the invention, which is defined in the claims set forth hereinafter.

I claim:

1. A pressure cooker comprising a pot means having an open top and adapted to contain a cooking liquid, closure means for the pot means that is vertically movable between a first position spaced above the open top of the pot means and a second position below the open top of the pot means and within the pot means and through an intermediate position spaced above the second position, means establishing a sliding and sealing connection between the pot means and the closure means throughout the range of movement of the closure means between its intermediate and second positions, whereby the pot means is closed and a confined space therein is defined that varies in volume to decrease progressively as the closure means is moved progressively downward from the intermediate to the second position thereof, food supporting means dependingly carried by and movable with the closure means for supporting food, said food supporting means being disposed above the open top of the pot means when the closure means is in its first position and being disposed within the confined space of variable volume when the closure means is below its intermediate position, and means for vertically moving the clousre means.

2. In a pressure cooking apparatus having a pot, a removable cover, and seal means between said pot and said cover, that improvement comprising, in combination, seal means lubricating means having valve means operably mounted relative said cover, and having an outlet outside the pressure cooking space in said pot, fluid conduit means communicating between the cooking fluid space of said pot and said valve means, and means to actuate said valve means, said seal means lubricating means constructed and adapted to pass cooking fluid under pressure through said fluid conduit means and into and out of said valve means, said means to actuate said valve means upon operation opening said valve means to discharge cooking fluids therefrom to contact and lubricate said seal means.

3. In a pressure cooking apparatus having a pot, a removable cover therefor, and seal means between said pot and said cover, that improvement comprising, in combination, means to lubricate said seal means when said cover is in sealing engagement with said pot having a valve stem vertically and slidably mounted through said cover, a valve actuating button rigidly mounted on the upwardly projecting end portion of said valve stem, a tee-like valve body rigidly mounted on the bottom of said cover immediately below said valve stem and above said seal means, said valve stem projecting through said body, a packing gland sealingly and slidably mounted on the top portion of said body and around said stem, a circular valve rigidly mounted on the downwardly projecting end portion of said valve stem, a valve seat in the bottom end portion of said body, said valve sealingly engageable with said valve seat, and said valve having an outlet above said seal means and outside the pressure cooking space of said pot, a helical spring mounted in compression on said valve stem between a top portion of said packing gland and a threadedly mounted adjusting nut on said valve stem above said packing gland, a fluid tube having one end portion thereof sealingly mounted in an aperture in a side portion of said valve body, the other end portion of said tube downwardly projectable into said pot below the cooking fluid level when said cover is mounted on said pot, said means to lubricate said seal means constructed and adapted to pass cooking fluid under pressure into and through said fluid tube and into said valve body, said valve stem forced downwardly to open said valve, and said fluid discharging from said body through said valve seat to contact and lubricate said seal means.

4. An automatic pressure cooker comprising, in combination, pot means, cover means movably mounted relative said pot means to confine and to vary the volume of confined vapor spaced within said pot means, seal means with said pot and cover means in operation sealing between said cover and pot means during closing of said pot means to effect and maintain confinement of the vapor space during relative movement of the cover and pot means, thereby reducing the volume of the vapor space and increasing the pressure therein and means mounted relative said pot and cover means for closing said pot means, said cooker constructed and adapted to cook foods in a cooking fluid in said pot means by immersing said food in said cooking fluid in said pot means, said seal means sealingly closing said pot means to result in pressure therein during cooking said cover means being provided with means to support the food.

5. An automatic pressure cooker comprising, in combination, a pot, a cover vertically and movably mounted relative said pot to close and to vary the volume of vapor space confined within said pot by said cover during relative movement of the pot and the cover, said cover having a seal engaging the walls of said pot and in operation sealing between said cover and pot during closing of said pot and during relative movement of the cover and the pot, thereby reducing the vapor space and increasing the pressure therein, electric means mounted relative said pot and operably connectible to a source of electric power, cooking fluid heating means mounted relative said pot and connected to said electric means, thermostat means mounted relative said pot and connected to said electric means to control the temperature of cooking fluid in said pot during cooking, pressure release valve means mounted relative said pot to in operation control the maximum pressure therein during cooking, electric motor means mounted relative said pot and cover means for closing said pot means, said cooker constructed and adapted to cook foods in cooking fluid in said pot by immersing said food in said cooking fluid, said seal means sealingly closing said pot to result in pressure therein during cooking.

6. An automatic deep-fat pressure cooker comprising, in combination, a housing means having a pot means rigidly mounted therein, a cover means vertically movably mounted on said pot means, said cover means having a seal means portion sealingly projectable into said pot means for confining and varying the volume of confined vapor space in the pot means during relative movement of the cover means and the pot means, electrical means mounted on said housing operably connected to a source of electrical power, cooking fluid heating means mounted in said pot means operably connected to said electrical means, thermostat means mounted on said housing and operably connecting to control the temerature of said heating means, pressure release valve means operably connected to a top portion of said pot means, electric motor means mounted in said housing operably connected to said cover means for raising and lowering same, said cooker constructed and adapted to cook foods in a cooking fluid positioned in said pot means by heating said fluid when so positioned by said heating means, immersing said food in said cooking fluid, said cover sealing means sealingly projecting into the top portion of said pot means creating a pressure therein, said electrical system and said pressure release valve maintaining predetermined heat, pressure, and cooking time, said pressure releasing through said pressure release valve, said cover raising from said pot means by said electrical means.

7. An automatic deep-fat pressure cooker comprising, in combination a box-like housing having a frame, a top, two sides, a front and back mounted on said frame, a top portion of said front defining an instrument panel, said top having a relatively large circular pot hole therein, a vertical mounting panel rigidly mounted in said frame and between said sides, a cup-like cylindrical pot rigidly mounted on the top end portion of said mounting panel by bracket and screw means and extended upwardly through said pot hole, a pressure line threadedly mounted in an upper side portion of said pot, a drain line threadedly in the central bottom portion of said pot, a pot cover having a generally round top portion and having a diameter slightly greater than the inside diameter of the said pot, two oppositely mounted slotted flanges on the edge portion thereof, a circular seal portion of said cover having a diameter slightly less than the diameter of said pot, said seal portion rigidly connected to said top portion, a circumferential groove in the outside edge of said seal portion, an O-ring mounted in said groove, a food basket removably mounted on the bottom portion of said seal portion, a geared bar mounted in each of said slots of said flanges and vertically depending therefrom and projecting through said top, an inverted channel vertically and rigidly mounted on each front side portion of said mounting panel, one of said bars slidingly projecting into one of said channels, the other of said bars slidingly projecting into the other of said channels, a horizontal shaft turnably mounted on a front portion of said mounting panel by bearing means, a reversible motor mounted on said mounting panel, gear means connecting said motor with each of said geared bars, an electrical heating element sealingly mounted in the bottom portion of said pot, a pressure switch line horizontally mounted on said pressure line, a pressure switch and an excess pressure switch mounted in series on said pressure switch line, a pressure release valve operably mounted on a horizontal portion of said pressure line, an exhaust line mounted on said release valve, two spaced recesses in the back portion of one of said bars, microswitch means mounted on said mounting panel operably engaging said last named gear bar, a temperature sensing device sealingly mounted in a lower portion of said pot and operably connected to a thermostat mounted on said instrument panel, manual bleed-off means mounted in a top portion of said pot, a pressure gauge mounted on said instrument panel operably connected to said manual bleed-off means, an O-ring lubricating assembly operably mounted in said top portion of said cover and intercommunicating with a bottom portion of said pot, an electrical system operably connected to a source of electrical power having a line switch mounted on said instrument panel to actuate said electrical system, a timer mounted on said panel, a pressure release button mounted on said panel and operably connected to said pressure release valve, electrical coils, breakers, fuses, and wiring means mounted on said mounting panel, said pressure cooker constructed and adapted to in operation heat cooking fluids in said pot, an electrical current passing through said thermostat from a source of electrical power to said heating element, said cover in a raised position from said pot, an electrical current passing through said electrical system to said motor, said motor driving said gear means, said gear means driving said geared bars downwardly to close said cover, said seal portion projecting into a top portion of said pot compressing gases therein, said pressure communicated to said control pressure switch, excess pressure switch, and said pressure release valve, said pressure release valve maintaining said pressure at a preset amount by spring means, said excess pressure switches opening and closing said pressure release valve to maintain a predetermined pressure in said pot, said microswitch means stopping said motor when said cover is in engagement with said pot, said timer actuating said electrical system at the expiration of a predetermined time setting thereon, said electrical system actuating said reversible motor to raise cover, said pressure release valve releasing said pressure in said pot, said microswitch means engaging said recess in said geared bar to stop said motor in a fully raised position.

* * * * *